2,787,551
COMPOSITIONS STABILIZED WITH HYDROXYINDOLE

Alan Bell and Gerald R. Lappin, Kingsport, Tenn., assignors to Eastman Kodak Company, Rochester, N. Y., a corporation of New Jersey No Drawing. Application February 24, 1954, Serial No. 412,373

12 Claims. (Cl. 99—163)

This invention relates to antioxidant compositions and to oxidizable materials stabilized therewith, and is particularly concerned with antioxidants comprising 5-hydroxyindole compounds and to oxidizable compositions containing stabilizing amounts of such antioxidants.

A large number of materials including fats, oils, and hydrocarbons such as gasoline and the like are normally subject to the deleterious effects of oxidation upon storage. As a consequence, it is usually desirable to incorporate in such oxidizable materials a small amount of a stabilizing material which is effective to reduce the oxidation to an unobjectionable level. A large number of stabilizers have been proposed for use alone or in various combinations. Among the stabilizers which have been tried for such applications are the p-hydroxy aromatic amines such as p-amino phenol. These materials exhibit a high antioxidant potency but suffer the serious disadvantage of being subject to air oxidation themselves and hence of being too unstable for practical use in most cases.

It is accordingly an object of this invention to provide a new and improved class of antioxidants which combine the high degree of antioxidant potency which is characteristic of p-hydroxy aromatic amines with an unusual degree of stability to oxidation themselves.

Another object of the invention is to stabilize normally oxidizable materials such as fats, oils, and hydrocarbons against objectionable oxidation by the incorporation therein of a hitherto unknown type of antioxidant.

Another object of the invention is to facilitate the storage of materials which are normally subject to the deleterious effects of oxidation by providing a highly effective class of antioxidants comprising 5-hydroxyindoles.

Another object of the invention is to provide new and improved antioxidant compositions of widespread utility.

Other objects will be apparent from the description and claims which follow.

These and other objects are attained by means of this invention, which comprises stabilizing normally oxidizable material with an antioxidant composition embodying this invention and comprising a 5-hydroxyindole of the formula

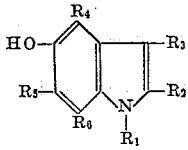

wherein $R_1$ is either hydrogen or an alkyl group and $R_2$, $R_3$, $R_4$, $R_5$ and $R_6$ are either hydrogen, alkyl, aryl, hydroxyl or amino groups. These antioxidants can be used alone or in admixture with other similar or dissimilar antioxidants and synergists. We have found that the antioxidant materials defined herein are very stable against air oxidation, and also are capable of imparting an excellent degree of resistance to oxidation to compositions which are normally subject to an objectionable degree of oxidation upon storage or use.

The antioxidants of this invention are characterized by having the indole structure with a hydroxyl substituent in the 5 position. The hydroxyindoles of this kind can be substituted in any one or more of the 2, 3, 4, 5 and 6 positions without negating the antioxidant potency of the material. In this way a large number of nuclearly substituted 5-hydroxyindoles can be used with essentially the same degree of effectiveness. The compounds which are of particular utility in practicing the invention are the nuclearly alkylated 5-hydroxyindoles wherein each alkyl group contains from 1 to 4 carbon atoms. Optimum results are obtained when the nuclear substituents are kept at a minimum level. Thus the lower alkyl-substituted 5-hydroxyindoles are preferred in practicing the invention, and the 2-alkyl and 2,6-dialkyl 5-hydroxyindoles are of particular utility.

The antioxidant compositions of this invention can be prepared in any desired manner. A highly successful method for preparing hydroxyindoles is the process described in the copending application of John F. Tinker, Serial No. 389,885, filed November 2, 1953. By the process therein described, indoles are readily prepared by the simple process of heating a mixture of Raney nickel and a 2-amino phenol alkanol whereby an indole is formed by concomitant dehydration and cyclization of the alkanol. This process is illustrated by Equation I.

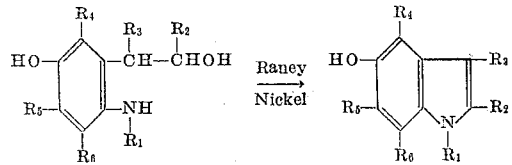

Equation I

In Equation I, $R_1$ represents either hydrogen or an alkyl group which is preferably a lower alkyl group of from 1 to 4 carbon atoms, $R_2$, $R_3$, $R_4$, $R_5$ and $R_6$ are either hydrogen or an alkyl, aryl, hydroxyl or amino group.

An alternative method of preparing the compounds embodying this invention comprises the reaction as illustrated in Equation II as follows:

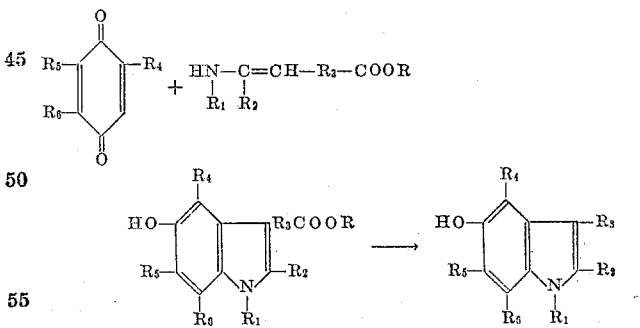

Equation II

In Equation II, $R_1$, $R_2$, $R_3$, $R_4$, $R_5$ and $R_6$ have the values assigned in the previous formulas.

The process is readily effected by heating a mixture of the quinone or substituted quinone together with the amino acid in a suitable solvent whereby a 5-hydroxyindole carboxylate is formed. This carboxylate can thereafter be hydrolyzed and decarboxylated simultaneously with aqueous alkali and then acidified to give the corresponding 5-hydroxyindole (including the substituted 5-hydroxyindoles as defined herein). The antioxidants prepared in accordance with this invention can be used for stabilizing any of the materials which are normally subject to oxidation. Thus, for example, these stabilizers are very effective for use in stabilizing fatty materials such as the glycerides, and including both the solid fats and the fatty oils. Thus they can be employed for stabilizing animal fats such as lard and the like, as well as vegetable oils such as cottonseed oil, soybean oil, cocoanut oil, corn oil, peanut oil, and the like, as well as free fatty acids such as oleic acid, and similar readily oxidizable fatty acids. In a similar manner the compounds of this invention can be used for stabilizing oxidizable hydrocarbons such as cracked gasoline and similar petroleum derivatives, as well as rubber and other oxidizable materials.

The amount of antioxidant which is employed in practicing this invention can be varied depending upon the material being stabilized, the degree of stabilization desired, the presence or absence of other stabilizing materials and similar variable factors. In most cases, the stabilizers are employed in concentrations of from about 0.005% to about 0.5% by weight based on the total weight of the composition being stabilized. Larger amounts such as amounts of as much as 1% or 2% or larger can be employed without deleterious effects, but such larger amounts are usually not necessary for optimum stabilization. Generally the compounds containing the least nuclear substituents can be employed in the lowest amounts since their activity appears to be somewhat higher than the more highly substituted compounds.

The preparation of typical compounds embodying this invention is illustrated by the following examples. Other compounds within the scope of the invention can be prepared in a similar manner as described herein, and it is not intended that the invention shall be limited to the specific compounds which are included for purposes of illustration.

EXAMPLE 1

Forty-three g. (0.4 mole) of quinone was dissolved in 500 ml. of acetone at 50° C. The resulting solution was added in portions to a solution of 51 g. (0.4 mole) of ethyl β-aminocrotonate in 50 ml. of acetone. The mixture was refluxed for 3 hours and then diluted with 100 ml. of water to give, after filtration, 34 g. of ethyl 5-hydroxy - 2 - methylindole - 3 - carboxylate. This ester was simultaneously hydrolyzed and decarboxylated by heating it with 10% aqueous sodium hydroxide. The resulting produce was then acidified and filtered to give 15 g. of 5-hydroxy-2-methylindole.

EXAMPLE 2

An alternative method of preparing 5-hydroxy-2-methylindole was effected by heating p-(2-chloroallylamino) phenol in an autoclave with hydrogen fluoride. By this method a poor yield of 5-hydroxy-2-methylindole was obtained.

EXAMPLE 3

Equimolar proportions of toluquinone and ethyl β-aminocrotonate were refluxed in acetone and then diluted with water. The produce was hydrolyzed wtih aqueous alkali and acidified to give a good yield of 5-hydroxy-2, 6-dimethylindole.

The other substituted 5-hydroxyindoles included within the invention can be prepared in a similar manner by the choice of a suitably substituted quinone and a suitable amino acid as set out in Equation II. In like manner, the hydroxyindoles of this invention can be prepared by a simple heating with Raney nickel according to the process shown in Equation I.

The utility of a typical 5-hydroxyindole in stabilizing gasoline is illustrated in the following example. The stabilization was tested according to the Active Oxygen Method (AOM), whereby air was bubbled through a sample of the stabilized composition and the time necessary for the sample to reach a peroxide content of 20 milliequivalents per kilogram was measured.

EXAMPLE 4

A stabilized composition was prepared by incorporating 0.01% of 5-hydroxy-2-methylindole into a Pennsylvania cracked gasoline which normally had an induction period in the A. O. M. test of 65 minutes without stabilization. The composition embodying this invention had an induction period in the same test of 440 minutes. Thus by the use of a relatively small amount of antioxidant of this invention, the stability against oxidation of the gasoline was increased more than 600%.

Similarly, improved results are obtained employing the antioxidants of this invention in fatty compositions which are normally subject to the development of rancidity. The results of a typical test in which lard was used as the substrate are set out in the following example.

EXAMPLE 5

Typical samples of lard were stabilized with equal amounts of butylated hydroxyanisole, and two typical antioxidants of this invention. The resulting compositions were then subjected to the A. O. M. test and compared with an unstabilized sample of lard. The results obtained are set out in Table 1. The data listed in the column headed A. O. M. represents the number of hours which were necessary to reach a peroxide value of 20. The last column in the test represents an antioxidant index wherein the compositions embodying this invention were compared with the butylated hydroxyanisole composition as a standard.

*Table 1*

| Antioxidant | Concentration, percent | A. O. M., hr. | A. I. |
|---|---|---|---|
| None | | 12.5 | |
| Butylated hydroxyanisole | 0.02 | 30 | 1 |
| 5-Hydroxy-2-methylindole | 0.02 | 215 | 11.6 |
| 5-Hydroxy-2,6-dimethylindole | 0.02 | 95 | 4.6 |

As can be seen from the table, greatly improved stabilities were obtained according to this invention. In utilizing the compounds of this invention, it may be desirable in some cases to employ mixtures of one or more of such compounds with other antioxidant materials such as butylated hydroxyanisole, tocopherol, or similar well known antioxidants, with or without the simultaneous use of synergizing acid such as citric acid or ortho phosphoric acid. Such compositions containing one or more other antioxidant materials in cobination with the antioxidants of this invention are considered to be within the scope of the invention. Such antioxidant compositions can also include a suitable vehicle which can be a fat, fatty oil, glyceride partial ester, or a solvent if desired.

The invention has been described in considerable detail with particular reference to certain preferred embodiments thereof. It will be understood, however, that variations and modifications can be effected without departing from the spirit and scope of the invention as described hereinabove, and as defined in the appended claims.

We claim:

1. A fatty material normally subject to oxidation stabilized with a nuclearly alkylated 5-hydroxy indole wherein each alkyl group contains from 1 to 4 carbon atoms.

2. A hydrocarbon normally subject to oxidation stabilized with a nuclearly alkylated 5-hydroxyindole wherein each alkyl group contains from 1 to 4 carbon atoms.

3. A composition of material comprising a normally oxidizable material stabilized with 2-alkyl-5-hydroxyindole wherein the alkyl group contains from 1 to 4 carbon atoms.

4. A composition of matter comprising a normally oxidizable material stabilized with a 2,6-dialkyl-5-hydroxyindole wherein each alkyl group contains from 1 to 4 carbon atoms.

5. A fatty triglyceride normally subject to oxidation stabilized with 2-methyl-5-hydroxyindole.

6. A fatty triglyceride normally subject to oxidation stabilized with 2,6-dimethyl-5-hydroxyindole.

7. Lard stabilized with 2-methyl-5-hydroxyindole.

8. Lard stabilized with 2,6-dimethyl-5-hydroxyindole.

9. A hydrocarbon stabilized with 2,6-dimethyl-5-hydroxyindole.

10. A hydrocarbon stabilized with 2-methyl-5-hydroxyindole.

11. Gasoline stabilized with 2-methyl-5-hydroxyindole.

12. Gasoline stabilized with 2,6-dimethyl-5-hydroxyindole.

References Cited in the file of this patent

UNITED STATES PATENTS

| | | |
|---|---|---|
| 1,906,221 | Ballauf et al. | May 2, 1933 |
| 2,377,423 | Howland et al. | June 5, 1945 |
| 2,521,415 | Schmerling | Sept. 5, 1950 |
| 2,559,907 | Van Lare et al. | July 10, 1951 |

OTHER REFERENCES

Chemical Reviews, vol. 30, pages 69 to 96 (1942), page 86 only used.

Jr. Chem. Soc. (London), 1948, pages 1605 to 1609, page 1609 only used.

Jr. Biol. Chem., vol. 180, pages 961 to 967 (1949), page 967 only used.

Beilstein, 4th edition, Band XXI, 1st Supp., page 218.